US009830395B2

(12) United States Patent
Mullins et al.

(10) Patent No.: US 9,830,395 B2
(45) Date of Patent: Nov. 28, 2017

(54) SPATIAL DATA PROCESSING

(71) Applicant: DAQRI, LLC, Los Angeles, CA (US)

(72) Inventors: Brian Mullins, Sierra Madre, CA (US); Matthew Kammerait, West Hollywood, CA (US); Frank Chester Irving, Jr., Woodland Hills, CA (US)

(73) Assignee: DAQRI, LLC, Los Angeles, CA (US)

( * ) Notice: Subject to any disclaimer, the term of this patent is extended or adjusted under 35 U.S.C. 154(b) by 344 days.

(21) Appl. No.: 14/461,266

(22) Filed: Aug. 15, 2014

(65) Prior Publication Data
US 2016/0048515 A1 Feb. 18, 2016

(51) Int. Cl.
G06F 17/30 (2006.01)
(52) U.S. Cl.
CPC .................. G06F 17/3087 (2013.01)
(58) Field of Classification Search
CPC .................................................. G06F 17/3087
See application file for complete search history.

(56) References Cited

U.S. PATENT DOCUMENTS

| 5,764,283 | A  | * | 6/1998 | Pingali .......... G06T 7/2033 348/169 |
| 2002/0123812 | A1 |  | 9/2002 | Jayaram et al. |
| 2004/0212630 | A1 |  | 10/2004 | Hobgood et al. |
| 2006/0208169 | A1 |  | 9/2006 | Breed et al. |
| 2010/0157018 | A1 |  | 6/2010 | Lampotang et al. |
| 2011/0018903 | A1 | * | 1/2011 | Lapstun ............... G02B 26/06 345/633 |

(Continued)

FOREIGN PATENT DOCUMENTS

WO WO-2012045914 A1 4/2012
WO WO-2016025732 A1 2/2016
(Continued)

OTHER PUBLICATIONS

Gao et al., "Easy Calibration of a Head-Mounted Projective Display for Augmented Reality Systems", IEEE, 2003, pp. 1-8.*
(Continued)

Primary Examiner — Etienne Leroux
Assistant Examiner — Jared Bibbee
(74) Attorney, Agent, or Firm — Schwegman Lundberg & Woessner, P.A.

(57) ABSTRACT

A system and method for spatial data processing are described. Path bundle data packages from a viewing device are accessed and processed. The path bundle data packages identify a user interaction of the viewing device with an augmented reality content relative to and based on a physical object captured by the viewing device. The path bundle data packages are generated based on the sensor data using a data model comprising a data header and a data payload. The data header comprises a contextual header having data identifying the viewing device and a user of the viewing device. A path header having data identifies the path of the interaction with the augmented reality content. A sensor header having data identifies the plurality of sensors. The data payload comprises dynamically sized sampling data from the sensor data. The path bundle data packages are normalized and aggregated. Analytics computation is performed on the normalized and aggregated path bundle data packages.

21 Claims, 12 Drawing Sheets

(56) References Cited

U.S. PATENT DOCUMENTS

| | | | |
|---|---|---|---|
| 2012/0038629 A1* | 2/2012 | Brown | A61B 3/113 345/419 |
| 2012/0056847 A1* | 3/2012 | Milford | G06F 1/3231 345/174 |
| 2012/0105440 A1 | 5/2012 | Lieberman et al. | |
| 2012/0154557 A1 | 6/2012 | Perez et al. | |
| 2012/0154633 A1 | 6/2012 | Rodriguez | |
| 2012/0249741 A1* | 10/2012 | Maciocci | G06F 3/011 348/46 |
| 2012/0263154 A1 | 10/2012 | Blanchflower et al. | |
| 2013/0010103 A1 | 1/2013 | Ihara et al. | |
| 2013/0050496 A1* | 2/2013 | Jeong | H04N 7/181 348/159 |
| 2013/0085642 A1* | 4/2013 | Dankers | B60T 8/172 701/48 |
| 2013/0135344 A1* | 5/2013 | Stirbu | G06F 17/30893 345/629 |
| 2013/0194110 A1* | 8/2013 | Kim | G02B 27/01 340/905 |
| 2013/0296030 A1* | 11/2013 | Arnone | A63F 9/24 463/25 |
| 2013/0317912 A1* | 11/2013 | Bittner | G06Q 30/0267 705/14.64 |
| 2013/0328762 A1 | 12/2013 | Mcculloch | |
| 2014/0002444 A1 | 1/2014 | Bennett et al. | |
| 2014/0067821 A1 | 3/2014 | Sykes | |
| 2014/0071164 A1 | 3/2014 | Saklatvala et al. | |
| 2014/0267411 A1* | 9/2014 | Fein | G06F 17/30241 345/633 |
| 2015/0026574 A1 | 1/2015 | Dow | |
| 2016/0049006 A1 | 2/2016 | Mullins et al. | |
| 2016/0049007 A1 | 2/2016 | Mullins et al. | |

FOREIGN PATENT DOCUMENTS

| | | |
|---|---|---|
| WO | WO-2016025808 A1 | 2/2016 |
| WO | WO-2016025811 A2 | 2/2016 |
| WO | WO-2016025811 A3 | 2/2016 |

OTHER PUBLICATIONS

Subramanian et al., "Arm Pointing Movements in a Three Dimensional Virtual Environment: Effect of Two Different Viewing Media", IEEE, 2008, pp. 181-185.*

David Prochazka et al., "Augmented Reality Implementation Methods in Mainstream Applications", Jun. 28, 2011, pp. 1-22.*

Shahzad Malik et al., "Robust 2D Tracking for Real-Time Augmented Reality", May 2002, pp. 1-9.*

"International Application Serial No. PCT/US2015/045233, International Search Report dated Oct. 30, 2015", 2 pgs.

"International Application Serial No. PCT/US2015/045233, Written Opinion dated Oct. 30, 2015", 8 pgs.

"International Application Serial No. PCT/US2015/045238, International Search Report dated Nov. 4, 2015", 2 pgs.

"International Application Serial No. PCT/US2015/045238, Written Opinion dated Nov. 4, 2015", 9 pgs.

"U.S. Appl. No. 14/461,264, Non Final Office Action dated Mar. 24, 2016", 25 pgs.

"U.S. Appl. No. 14/461,264, Notice of Allowance dated Aug. 25, 2016", 5 pgs.

"U.S. Appl. No. 14/461,264, PTO Response to Rule 312 Communication dated Nov. 14, 2016", 2 pgs.

"U.S. Appl. No. 14/461,264, Response filed Jun. 21, 2016 to Non Final Office Action dated Mar. 24, 2016", 9 pgs.

"U.S. Appl. No. 14/461,277, Corrected Notice of Allowance dated Oct. 14, 2016", 2 pgs.

"U.S. Appl. No. 14/461,277, Non Final Office Action dated May 18, 2016", 18 pgs.

"U.S. Appl. No. 14/461,277, Notice of Allowance dated Sep. 12, 2016", 7 pgs.

"U.S. Appl. No. 14/461,277, Response filed Aug. 18, 2016 to Non Final Office Action dated May 18, 2016", 12 pgs.

"International Application Serial No. PCT/US2015/045084, International Search Report dated Nov. 9, 2015", 2 pgs.

"International Application Serial No. PCT/US2015/045084, Written Opinion dated Nov. 9, 2015", 9 pgs.

"International Application Serial No. PCT/US2015/045233, International Preliminary Report on Patentability dated Aug. 30, 2016", 29 pgs.

"International Application Serial No. PCT/US2015/045238, International Preliminary Report on Patentability dated Aug. 26, 2016", 11 pgs.

"International Preliminary Report on Patentability, Corrected, dated Oct. 3, 2016", 10 pgs.

"U.S. Appl. No. 14/461,264, Notice of Allowance dated Feb. 3, 2017", 7 pgs.

"U.S. Appl. No. 14/461,277, Notice of Allowance dated Jan. 26, 2017", 7 pgs.

* cited by examiner

| | |
|---|---|
| Contextual Header | The Contextual Header contains data related to the user and device attached to this path, it may change from path to path, but is not directly related to the data samples collected. |
| Path Header | The Path Header contains data related to that specific path bundle. This will change from each instance of a new path, but will not change for all of the sample points within the path. The Path Header will also list the number and type of sensors collected (which will be described by the sensor header) |
| Sensor Header | The Sensor Header describes each specific sensor that will be collected in this path, and also provides technical information about their collection such as the sample frequency or the threshold that will trigger a non-frequency-based sample. |
| Sampling Data | The Sampling Data is a dynamically sized series of data samples that indicate which sensor is used, the time of the sample, the step # of the sample, whether it was frequency or threshold triggered, etc. |

500 → (overall)
502 → Data Header (506 Contextual Header, 508 Path Header, 510 Sensor Header)
504 → Data Payload (512 Sampling Data)

FIG. 5

SPATIAL DATA PROCESSING

CROSS-REFERENCE TO RELATED APPLICATIONS

This application is related to U.S. patent application ser. No. 14/461,264 filed Aug. 15, 2014, entitled "SPATIAL DATA COLLECTION," and U.S. patent application Ser. No. 14/461,277, filed Aug. 15, 2014, entitled "SPATIAL DATA VISUALIZATION," which are incorporated herein by reference in their entirety.

TECHNICAL FIELD

The subject matter disclosed herein generally relates to the processing of data. Specifically, the present disclosure addresses systems and methods for spatial data processing for augmented reality experiences.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics or GPS data. With the help of advanced AR technology (e.g., adding computer vision and object recognition), information about the surrounding real world of the user becomes interactive. Device-generated (e.g., artificial) information about the environment and its objects can be overlaid on the real world.

The ability to process spatial data in conjunction with an augmented reality experience (as well as in conjunction with other sensor streams) provides unprecedented analysis capabilities. However, the analytical processing may be extremely time intensive given the multidimensional data from multiple sensors.

BRIEF DESCRIPTION OF THE DRAWINGS

Some embodiments are illustrated by way of example and not limitation in the figures of the accompanying drawings.

FIG. 5 is a diagram illustrating an example embodiment of a path bundle packaged data model.

DETAILED DESCRIPTION

Figure 1:
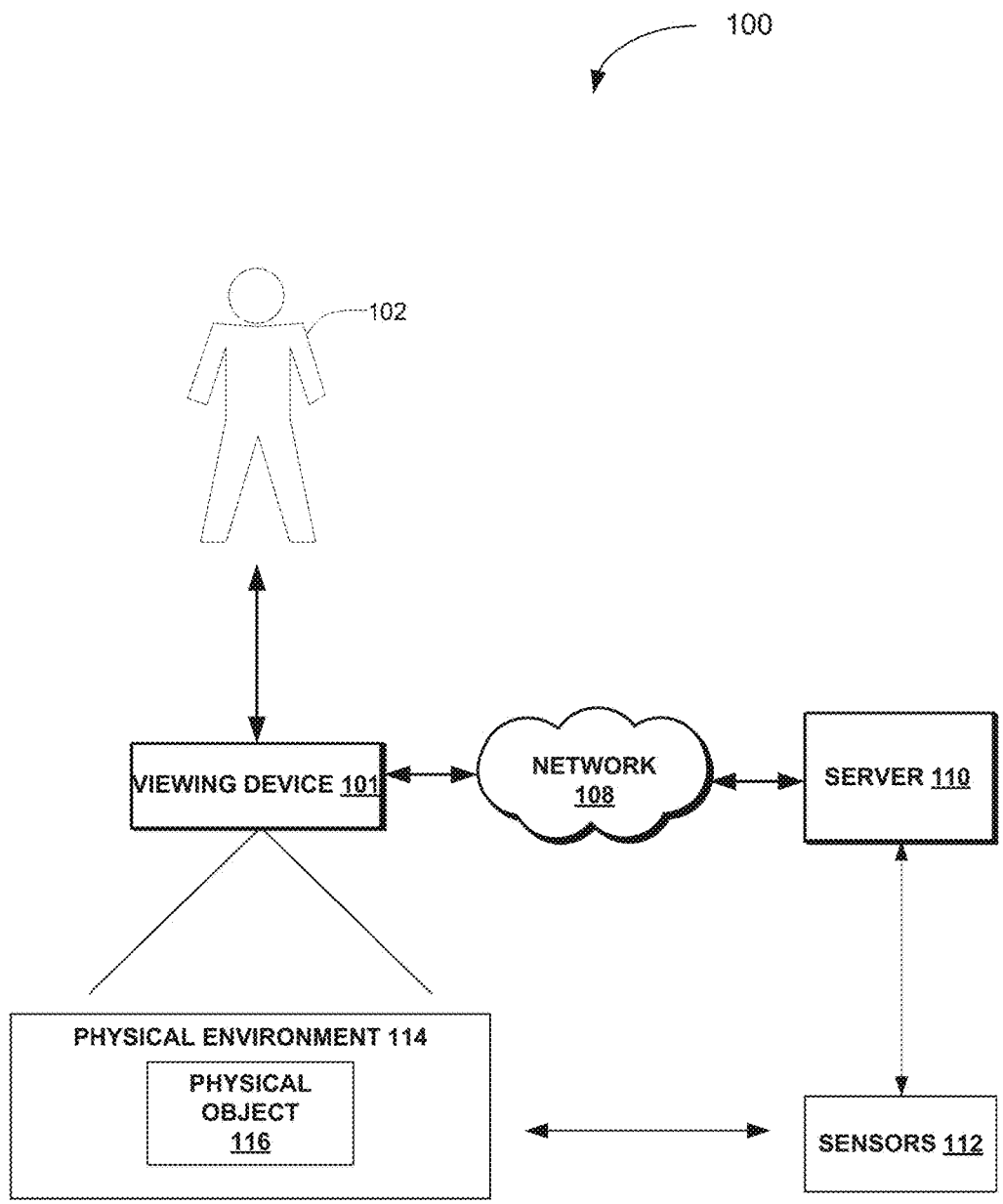
FIG. 1 is a block diagram illustrating an example of a network suitable for spatial data collection for augmented reality experiences, according to some example embodiments.

Example methods and systems are directed to spatial data processing of augmented reality. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality applications allow a user to experience information, such as in the form of a virtual object such as a three-dimensional virtual object overlaid on an image of a physical object captured with a camera of a viewing device. The physical object may include a visual reference (e.g., a recognized image, pattern, or object) that the augmented reality application can identify. A visualization of the additional information, such as the three-dimensional virtual object overlaid or engaged with an image of the physical object, is generated in a display of the viewing device. The three-dimensional virtual object may be selected based on the recognized visual reference or captured image of the physical object. A rendering of the visualization of the three-dimensional virtual object may be based on a position of the display relative to the visual reference. Other augmented reality applications allow a user to experience visualization of the additional information overlaid on top of a view or an image of any object in the real physical world. The virtual object may include a three-dimensional virtual object, a two-dimensional virtual object. For example, the three-dimensional virtual object may include a three-dimensional view of a chair or an animated dinosaur. The two-dimensional virtual object may include a two-dimensional view of a dialog box, menu, or written information such as statistics information for properties or physical characteristics of the object (e.g., temperature, mass, velocity, tension, stress). An image of the virtual object may be rendered at the viewing device or at a server in communication with the viewing device.

A system and method for spatial data processing are described. Path bundle data packages from a viewing device are accessed and processed. The path bundle data packages identify a user interaction of the viewing device with an augmented reality content relative to and based on a physical object captured by the viewing device. For example, the path identifies a geographic viewing pattern of the user on the viewing device. The path may identifies a viewing path of the user. For example, the user may first view a top portion of a physical object and move the viewing device towards the bottom of the physical object along a vertical line or any other geometric trajectories. A path bundle data package is generated based on the sensor data using a data model comprising a data header and a data payload. The data header comprises a contextual header having data identifying the viewing device and a user of the viewing device. A path header having data identifies the path of the interaction with the augmented reality content. A sensor header having data identifies the plurality of sensors. The data payload comprises dynamically sized sampling data from the sensor data. The path bundle data packages are normalized and aggregated. Analytics computation is performed on the normalized and aggregated path bundle data packages.

In an example embodiment, a path bundle processing module generates an extension of the data model to represent the normalized and aggregated path bundle data packages. The path bundle processing module accesses trigger conditions and performs the analytics computation on the extension of the data model based on the trigger conditions. The path bundle processing module then identifies a spatial pattern based on the trigger conditions.

In another example embodiment, spatial and sensor data from multiple sources are normalized and aggregated across multiple dimensions from the paths to filter singular and aggregate data. An extension of the data model may be generated to represent the normalized and aggregated path bundle data packages to be consistent with the singular data paths, the normalized and aggregated path bundle data packages being a subset or most common denominator of the multiple singular data paths.

In another example embodiment, an analytics module is configured to identify spatial patterns for accidents and event predictions, to recognize similar patterns and warn operators of the viewing device, to assign weighting schemes for switching amongst sensors of the viewing device, to identify user focus points or a user loss of focus and to redirect the user, to rank task complexity and calibrating user skill levels based on the normalized and aggregated path bundle data packages, and to identify spatial movement-based gestures and interfaces based on the normalized and aggregated path bundle data packages.

In one example embodiment, the user interaction identifies a path of an interaction with the augmented reality content. The path bundle data package is generated based on the sensor data using a data model comprising a data header and a data payload. The data header comprises a contextual header having data identifying the viewing device and a user of the viewing device. A path header includes data identifying the path of the interaction with the augmented reality content, and a sensor header having data identifying a plurality of sensors of the viewing device. The data payload comprises dynamically sized sampling data from the sensor data. The sensor data is related to a position and an orientation of the viewing device over time. The sensors comprise optical sensors and inertia sensors. The path of the interaction comprises a spatial path relative to the augmented reality content.

The contextual header comprises a viewing device identifier, a session identifier, a physical location, and a viewing device type. The path header comprises a path start time, a path end time, a type of sensor identifier for each corresponding sensor, a total duration of the path, a total distance of the path. The sensor header comprises, for each sensor, a sensor identifier, a sensor position identifier, three dimensional position data, orientation data, and a number of data samples. The dynamically sized sampling data comprises a sensor identifier, a data sample number, a relative time, a duration percentage through the path, and a time percentage through the path.

FIG. 1 is a network diagram illustrating a network environment 100 suitable for operating an augmented reality application of a viewing device, according to some example embodiments. The network environment 100 includes a viewing device 101 and a server 110, communicatively coupled to each other via a network 108. The viewing device 101 and the server 110 may each be implemented in a computer system, in whole or in part, as described below with respect to FIGS. 12 and 13.

The server 110 may be part of a network-based system. For example, the network-based system may be or include a cloud-based server system that provides additional information, such as three-dimensional models or other virtual objects, to the viewing device 101.

A user 102 may utilize the viewing device 101 to capture a physical object 116 in a real world physical environment 114 viewed by the user 102. The user 102 may be a human user (e.g., a human being), a machine user (e.g., a computer configured by a software program to interact with the viewing device 101), or any suitable combination thereof (e.g., a human assisted by a machine or a machine supervised by a human). The user 102 is not part of the network environment 100, but is associated with the viewing device 101 and may be a user 102 of the viewing device 101. For example, the viewing device 101 may be a computing device with a display such as a smartphone, a tablet computer, a wearable computing device (e.g., watch or glasses), or a head-mounted computing device (e.g. helmet). The computing device may be hand held or may be removably mounted to the head of the user 102. In one example, the display may be a screen that displays what is captured with a camera of the viewing device 101. In another example, the display of the viewing device 101 may be transparent or semi-transparent such as in lenses of wearable computing glasses or the visor of a helmet. The viewing device may include optical and non-optical sensors for identifying the physical object 116 and the position and orientation of the viewing device 101 relative to the physical object 116.

The user 102 may be a user of an augmented reality application in the viewing device 101 and at the server 110. The augmented reality application may provide the user 102 with an augmented experience triggered by identified objects or references in the physical environment 114. The physical environment 114 may include identifiable objects such as a two-dimensional physical object (e.g., a picture), a three-dimensional physical object (e.g., a factory machine), a location (e.g., at the bottom floor of a factory), or any references (e.g., perceived corners of walls or furniture) in the real world physical environment 114. For example, the user 102 may point a camera of the viewing device 101 to capture an image of the physical object 116.

In one embodiment, the objects in the image are tracked and recognized locally in the viewing device 101 using a local context recognition dataset or any other previously stored dataset of the augmented reality application of the viewing device 101. The local context recognition dataset module may include a library of virtual objects associated with real-world physical objects or references. In one example, the viewing device 101 identifies feature points in an image of the physical object 116 to determine different planes (e.g., edges, corners, surface). The viewing device 101 also identifies tracking data related to the physical object 116 (e.g., GPS location of a bridge, facing west, e.g., viewing device 101 standing x meters away from the bridge, etc.). If the captured image is not recognized locally at the viewing device 101, the viewing device 101 downloads additional information (e.g., the three-dimensional model) corresponding to the captured image, from a database of the server 110 over the network 108.

In another embodiment, the image of the physical object 116 is tracked and recognized remotely at the server 110 using a remote context recognition dataset or any other previously stored dataset of an augmented reality application in the server 110. The remote context recognition dataset module may include a library of virtual objects associated with real-world physical objects or references.

Sensors 112 may be associated with, coupled to, related to the physical object 116 in the physical environment 114 to measure properties of the physical object 116. Examples of measured physical properties may include and but are not limited to weight, pressure, temperature, velocity, direction, position, intrinsic and extrinsic properties, acceleration, and dimensions. For example, the sensors 112 may include a blood pressure and heart rate monitor coupled to a subject. For example, the server 110 can generate a picture or a virtual three-dimensional model of a heart with a beating animation with a pace corresponding to the measured heart rate from the sensors 112. The server 110 may change a color in corresponding portions of the heart based on the measured blood pressure. The live animation is provided to the viewing device 101 such that the picture of the heart is displayed on top of a chest area of the subject in the display of the viewing device 101. The position of the picture of the heart may be determined based on the orientation and position of the viewing device 101 relative to the subject using sensors (e.g., gyroscope) internal to the viewing device 101.

In another embodiment, the sensors 112 may include other sensors used to track the location, movement, and orientation of the viewing device 101 externally without having to rely on the sensors internal to the viewing device 101. The sensors 112 may include optical sensors (e.g., depth-enabled 3D camera), wireless sensors (Bluetooth, Wi-Fi), GPS sensor, and audio sensor to determine the location of the user 102 having the viewing device 101, distance of the user 102 to the tracking sensors 112 in the physical environment 114 (e.g., sensors 112 placed in corners of a venue or a room), the orientation of the viewing device 101 to track what the user 102 is looking at (e.g., direction at which the viewing device 101 is pointed, e.g., viewing device 101 pointed towards a player on a tennis court, viewing device 101 pointed at a person in a room).

In another embodiment, data from the sensors 112 and internal sensors in the viewing device 101 may be used for analytics data processing at the server 110 (or another server) for analysis on usage and how the user 102 is interacting with the physical environment 114 and the virtual content based on the physical object 116. Live data from other servers may also be used in the analytics data processing. For example, the analytics data may track at what locations (e.g., points or features) on the physical or virtual object the user 102 has looked, how long the user 102 has looked at each location on the physical or virtual object, how the user 102 held the viewing device 101 when looking at the physical or virtual object, which features of the virtual object the user 102 interacted with (e.g., such as whether the user 102 tapped on a link in the virtual object), and any suitable combination thereof. The viewing device 101 receives a visualization content dataset related to the analytics data. The viewing device 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 12, 13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., viewing device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
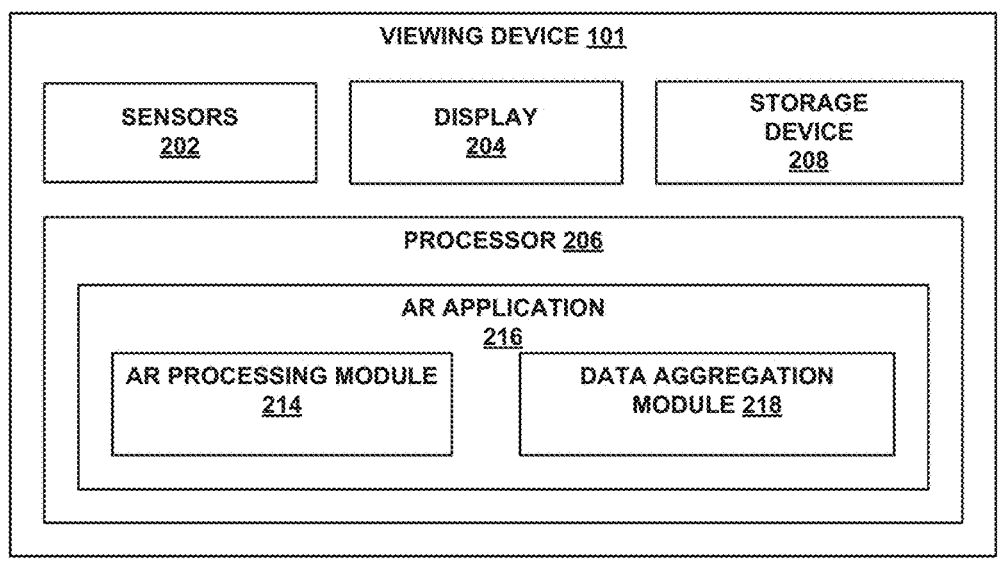
FIG. 2 is a block diagram illustrating an example embodiment of modules (e.g., components) of a viewing device.

FIG. 2 is a block diagram illustrating modules (e.g., components) of the viewing device 101, according to some example embodiments. The viewing device 101 may include sensors 202, a display 204, a processor 206, and a storage device 208. For example, the viewing device 101 may be a wearable computing device (e.g., glasses or helmet), a desktop computer, a vehicle computer, a tablet computer, a navigational device, a portable media device, or a smart phone of a user. The user may be a human user (e.g., a human being), a machine user (e.g., a computer configured by a software program to interact with the viewing device 101), or any suitable combination thereof (e.g., a human assisted by a machine or a machine supervised by a human).

The sensors 202 may include, for example, a proximity or location sensor (e.g., Near Field Communication, GPS, Bluetooth, Wi-Fi), an optical sensor (e.g., infrared camera, time of flight sensors, structured light sensors), inertial sensors, compass, gyroscope, temperature sensors, humidity sensors, an audio sensor (e.g., a microphone), or any suitable combination thereof. For example, the sensors 202 may include a rear facing camera and a front facing camera in the viewing device 101. It is noted that the sensors 202 described herein are for illustration purposes; the sensors 202 are thus not limited to the ones described. The sensors 202 may be used to generate internal tracking data of the viewing device 101 to determine what the viewing device 101 is capturing or looking at in the real physical world.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., Head-Up Display, see through screen).

The processor 206 may include an augmented reality application 216 for generating a display of a three-dimensional virtual object related to a physical object captured by the viewing device 101. In one example embodiment, the augmented reality application 216 may include an augmented reality processing module 214 and a data aggregation module 218.

The augmented reality processing module 214 identifies a physical object that the viewing device 101 is pointed to. The augmented reality processing module 214 may detect, generate, and identify identifiers such as feature points of the physical object being viewed or pointed at the viewing device 101 using an optical device of the viewing device 101 to capture the image of the physical object. As such, the augmented reality processing module 214 may be configured to identify one or more physical objects. The identification of the object may be performed in many different ways. For example, feature points of the physical object may be determined based on several image frames of the physical object. The identity of the physical object may be also determined using any visual recognition algorithm. In another example, a unique identifier may be associated with the physical object. The unique identifier may be a unique wireless signal or a unique visual pattern such that the augmented reality processing module 214 can look up the identity of the physical object based on the unique identifier from a local or remote content database. In another example embodiment, the augmented reality processing module 214 includes a facial recognition algorithm to determine an identity of a subject or object. The augmented reality processing module 214 may be configured to determine whether the captured image matches an image locally stored in a local database of images and corresponding additional information (e.g., three-dimensional model and interactive features) on the viewing device 101. In one embodiment, the augmented reality processing module 214 retrieves a primary content dataset from the server 110, and generates and updates a contextual content dataset based on an image captured with the viewing device 101.

The augmented reality processing module 214 may include a local rendering engine that generates a visualization of a three-dimensional virtual object overlaid on (e.g., superimposed upon, or otherwise displayed in tandem with) an image of a physical object captured by a camera of the viewing device 101 in the display 204 of the viewing device 101. A visualization of the three-dimensional virtual object may be manipulated by adjusting a position of the physical object (e.g., its physical location, orientation, or both) relative to the camera of the viewing device 101. Similarly, the visualization of the three-dimensional virtual object may be manipulated by adjusting a position of the camera of the viewing device 101 relative to the physical object.

In another example embodiment, the augmented reality processing module 214 may retrieve three-dimensional models of virtual objects associated with a captured real world object. For example, the captured image may include a visual reference (also referred to as a marker) that consists of an identifiable image, symbol, letter, number, machine-readable code. For example, the visual reference may include a bar code, a quick response (QR) code, or an image that has been previously associated with a three-dimensional virtual object (e.g., an image that has been previously determined to correspond to the three-dimensional virtual object).

The data aggregation module 218 may be configured to access data from the sensors 202 and aggregate the data using a path bundle packaged data model. The data aggregation module 218 collects spatial positioning, movement and sensor data attached to an augmented reality event flow. This process includes the data organization format and process for linking the positioning, movement and sensor data to other non-spatial/sensor data. In an example embodiment, the path bundle packaged data model includes separating the data into a header that contains contextual and technical/calibration information, and the payload, which contains the actual spatial and sensor data. The header information is organized to contain information specific to the path context, like the AR session linked to the path, the time, the location (which may be moved to the payload), the device type, the user, etc. The header also includes technical/calibration information specific to the path data itself, such as a listing of all the sensors being captured, specific data about their frequency/thresholds, an initial camera matrix, start time/end time, etc. The payload contains the spatial/sensor data encapsulated in such a way that multiple data points can be tied together when processing (typically via time, but also possibly through other means like step number, or percentage of path). The creation of this data model allows the capture of spatial and analytics data across multiple devices and combines/aggregates/filters it as necessary without modifying the original pure data stream.

Figure 3:
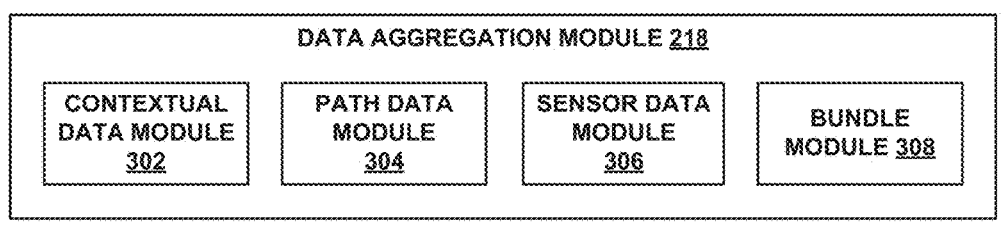
FIG. 3 is a block diagram illustrating an example embodiment of modules of a data aggregation module.

In an example embodiment and referring to FIG. 3, the data aggregation module 218 includes a contextual data module 302, a path data module 304, a sensor data module 306, and a bundle module 308. The contextual data module 302 generates data related to the user and the viewing device attached to the path. Data may change from path to path but may not be directly related to data samples collected. The path data module 304 generates data related to the corresponding path bundle. That data may change from each data sample instead of a new path, but may not change for all the sample points within the path. The data from the path data module 304 may also list a number and type of sensors from which data is collected. The sensor data module 306 generates data related to each specific sensor for a path. For example, the data from the sensor data module 306 may include technical information about their collection such as the sample frequency or the threshold that will trigger a non-frequency-based sample. The bundle module 308 aggregates data from the contextual data module 302, path data module 304, the sensor data module 306, and sampling data from the sensors using a path bundle packaged data model. The sampling data includes, for example, dynamically sized series of data samples that indicate which sensor is used, the time of the sample, the step number of the sample, whether it was frequency or threshold triggered, etc.

The storage device 208 may be configured to store the path bundle packaged data, database of identifiers of physical objects, tracking data, and corresponding virtual user interfaces. In another embodiment, the storage device 208 may also include visual references (e.g., images) and corresponding experiences (e.g., three-dimensional virtual objects, interactive features of the three-dimensional virtual objects). For example, the visual reference may include a machine-readable code or a previously identified image (e.g., a picture of a shoe). The previously identified image of the shoe may correspond to a three-dimensional virtual model of the shoe that can be viewed from different angles by manipulating the position of the viewing device 101 relative to the picture of the shoe. Features of the three-dimensional virtual shoe may include selectable icons on the three-dimensional virtual model of the shoe. An icon may be selected or activated by tapping on or moving the viewing device 101.

In one embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by AR processing module 214.

The contextual content dataset includes, for example, a second set of images and corresponding experiences (e.g., three-dimensional virtual object models) retrieved from the server 110. For example, images captured with the viewing device 101 that are not recognized (e.g., by the server 110) in the primary content dataset are submitted to the server 110 for recognition. If the captured image is recognized by the server 110, a corresponding experience may be downloaded at the viewing device 101 and stored in the contextual content dataset. Thus, the contextual content dataset relies on the context in which the viewing device 101 has been used. As such, the contextual content dataset depends on objects or images scanned by the AR processing module 214 of the viewing device 101.

In one embodiment, the viewing device 101 may communicate over the network 108 with the server 110 to retrieve a portion of a database of visual references, corresponding three-dimensional virtual objects, and corresponding interactive features of the three-dimensional virtual objects.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4A:
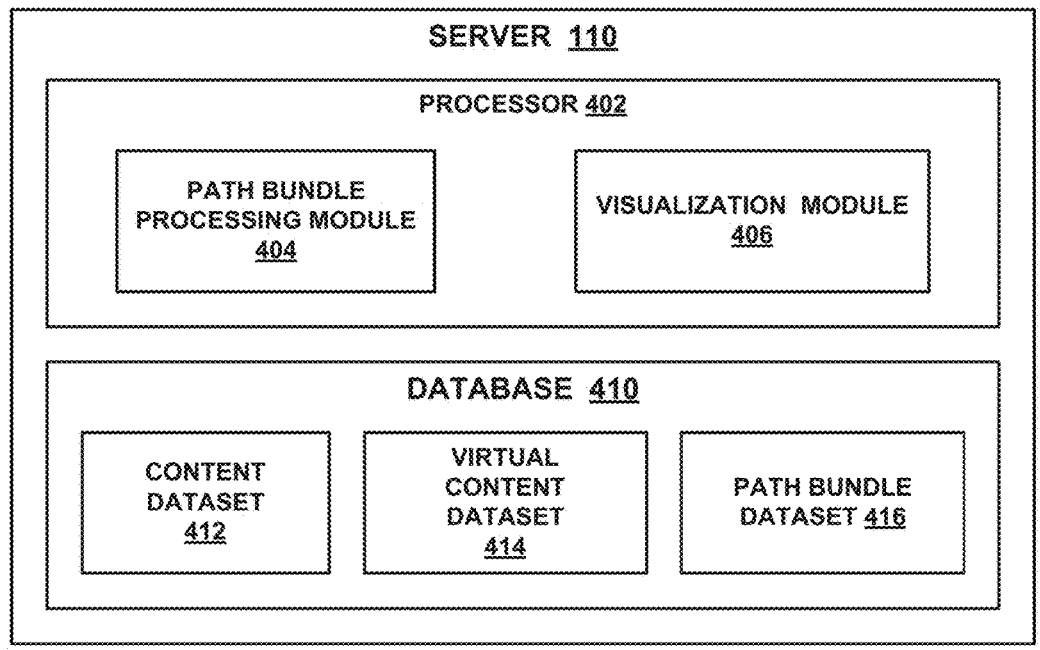
FIG. 4A is a block diagram illustrating an example embodiment of modules of a server.

FIG. 4A is a block diagram illustrating modules (e.g., components) of the server 110. The server 110 includes a processor 402 and a database 410. The processor 402 may include a path bundle processing module 404 and a visualization module 406. The path bundle processing module 404 performs aggregation, filtering and any non-visual processing (pattern recognition, predictive analysis) on the raw data paths. The visualization module 406 uses algorithms to combine the processed path bundles with the original models/assets to generate visually processed data and convert it to a report, visual display or AR experience.

The database 410 may store a content dataset 412, a virtual content dataset 414, and path bundle dataset 416. The content dataset 412 may store a primary content dataset and a contextual content dataset. The primary content dataset comprises a first set of images and corresponding virtual object models. A captured image received from the viewing device 101 is not recognized in the content dataset 412, and the contextual content dataset is generated for the viewing device 101. The contextual content dataset may include a second set of images and corresponding virtual object models. The virtual content dataset 414 includes models of virtual objects to be generated upon receiving a notification associated with an image of a corresponding physical object. The path bundle dataset 416 includes visually processed data and/or raw data paths.

Figure 4B:
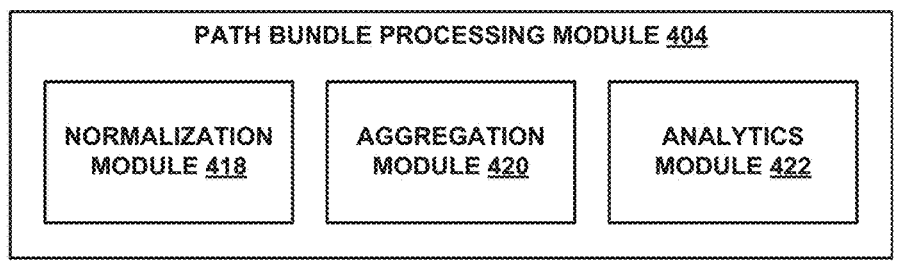
FIG. 4B is a block diagram illustrating an example embodiment of a path bundle processing module.

FIG. 4B is a block diagram illustrating an example embodiment of components in the path bundle processing module 404. The path bundle processing module 404 enables normalization and aggregation of spatial/sensor data from different sources and across multiple dimensions. Specifically, an analog spatial method is developed for basic aggregations like average/median/sum/min/max/standard deviation/variance that occur in most data processing applications. The same processing method allows for filtering out singular and aggregate data. For example, the path bundle processing module 404 may provide an answer in response to a query such as "Give me the average movement/scenario for the 10 seconds prior to event X (a sale/industrial accident/etc) across all users of type Y or some other arbitrary segmentation. An extension of the data model may be created to represent aggregated data in a way that is consistent with the singular data paths. In other words, the aggregate data will end up being a subset or most common denominator of the multiple singular data paths.

The path bundle processing module 404 may include a normalization module 418, an aggregation module 420, and an analytics module 422.

The normalization module 418 may normalize the path bundle data packages. For example, all data path bundle packages may be normalized to eliminate the first and last 10% of the data path bundle. In another example, all path bundle data packages may be normalized to a common timing scheme independent of the path bundle's location or device.

The aggregation module 420 may aggregate the normalized path bundle data packages. For example, all path bundle data packages may be aggregated to combine all path bundle data packages for a particular device type into a single aggregate path bundle data package. In another example, all path bundle data packages may be statistically aggregated by combing path data bundle samples using common statistical methods such as an average or median of all sensor sample data for a particular bundle dimension.

In one embodiment, the normalization and the aggregation modules 418, 420 normalize and aggregate spatial and sensor data from multiple sources (e.g., from different sensors) across multiple dimensions (e.g., position, orientation, time) from the paths to filter singular and aggregate data. In another example embodiment, the normalized and aggregated path bundle data packages may be a subset or most common denominator of the multiple singular data paths. This normalization and aggregation reduces multiple data path bundles describing multiple sensor types into a single path bundle that represents the entire data set, but can still be manipulated, processed, and analyzed as a single path bundle data package. For example, if a particular process expects a path bundle data package as an input, but multiple path bundle data packages exist, the embodiment would be able to normalize and aggregate the multiple path bundle data packages into a single representative path bundle data package that can go through that particular process without further modification.

The analytics module 422 may perform analytics computation on the normalized and aggregated path bundle data packages. For example, the analytics module 422 may be used for:

recognizing spatial patterns for accident and event prediction (e.g., 99% of a task's errors occur when operators are >30 cm from an instrument panel); in this example, the analytics data for the spatial sensors is correlated to process errors using session data and timing data found in the analytics contextual data information. Where an error is detected in the user session data, the spatial sensor data is selected for a particular period before and after the error occurred. Statistical analysis is used to identify important correlations between error occurrences and spatial sensor data.

recognizing when similar patterns may occur and warning operators (e.g., display a warning when an operator moves beyond 30 cm from an instrument panel); When an established pattern is identified, analytics data can then be checked in real time either on the user device or on an analytics server to identify whether that particular sensor data pattern has been matched. For example, sensor data used to generate the augmented reality interaction can then be collected as analytics data and processed in real-time either on or off the user device. When a particular pattern is identified in the analytics data, a message or command can be sent to the user device to notify the user.

using weighting schemes to intelligently switch amongst sensors (e.g., using a temperature sensor's output to determine when infrared vs. visual light processing should be used); as augmented reality interactions occur, the generated analytics data can be processed in real-time to identify whether any particular patterns are seen or conditions are met, and then send a command back to the device to change the particular sensors used, or perform any other action.

identifying user/operator focus points or loss-of-focus points to redirect them (e.g., when a user's spatial data indicates that they have not looked at a critical component for too long, visually direct them to the correct component); the inherent spatial and movement sensor data used to create an augmented reality experience can be reported as analytics data. This sensor data can be processed to identify particular movement or orientation patterns, such as rapid pupil eye movement or repeated head nodding by comparing the sensor data to known behaviors. When these behaviors are detected, a command can be set back to the device, or any other relevant system, to initiate a process to remediate the users' undesired or unsafe behavior.

ranking task complexity and calibrating user skill levels (e.g., using total eye movement or eye movement rate to determine how many steps or how many concurrent processes a user is performing); the users' undesired or unsafe behavior. The inherent spatial and movement sensor data used to create an augmented reality experience can be reported as analytics data. This sensor data can be stored and analyzed to identify specific patterns to calibrate the tasks represented by the associated user activity. For example, the rate of pupil movement associated with the time between two known analytics events can be used to identify the complexity level of the task that occurs between those two events.

spatial movement-based gestures and interfaces (e.g., using spatial movements to capture and record previous or current movement, sensor, or visual activity so the user's hands (and concentration) are free); the inherent spatial and movement sensor data used to create an augmented reality experience can be reported as analytics data. This analytics data can be analyzed outside of the augmented reality process to identify patterns. This capability can be utilized by developing specific patterns that a user can recreate. When these patterns are identified in the analytics data, the processing system can send a command to the device and/or any other relevant system.

automatic tool/task/processing switching based on AR analytics (e.g., change camera processing from low-res to high-res when a user is spatially looking at a more granular gauge); the inherent spatial and movement sensor data used to create an augmented reality experience can be reported as analytics data. This analytics data can be analyzed in conjunction with contextual user data to automatically modify the user experience. For example, contextual user data may indicate that a user prefers a particular color or style for an augmented reality experience, the analytics data that indicates that a user is initiating that experience can be matched with that user's data to provide a customized or specialized interface for the user.

using cohort analysis techniques to identify specific benefits/pain points of AR experiences (e.g., use spatial data to identify what model/asset component users are looking at before they purchase an item). The inherent spatial and movement sensor data used to create an augmented reality experience can be reported as analytics data. This analytics data can then be input into traditional analytics techniques by collecting, normalizing, aggregating and formatting the data into traditional models.

In one embodiment, the analytics module 422 generates an extension of the data model to represent the normalized and aggregated path bundle data packages. If multiple users perform a task and each generates a single path bundle data package, the data model extension allows that the multiple path bundle data packages may be combined in such a way that a single path bundle data package is produced that represents all source path bundle data packages and can be manipulated, processed and visualized similar to a normal path bundle data package.

For example, if a temperature sensor is being used by multiple users, the maximum temperature sample from each user may be combined to generate an overall maximum temperature bundle data package. This aggregated bundle data package may take the form of a standard path bundle data package, but contain a single data sample from each user instead of all data samples being related to the same user.

The analytics module 422 may determine whether predefined conditions are triggered based on the analysis. For example, the analytics module 422 may perform an analytics computation on the extension of the data model based on the trigger conditions and identify a particular spatial pattern (e.g., looking left to right, looking at a particular point for x seconds) based on the trigger conditions.

FIG. 5 is a diagram illustrating an example embodiment of a path bundle packaged data model 500. The data model 500 may include a data header 502 and a data payload 504. The data header 502 may include a contextual header 506, a path header 508, and a sensor header 510. The data payload 504 may include sampling data 512. The contextual header 506 may include, for example, data related to a user and a viewing device attached to the path. The data may change from path to path and may not be directly related to the data samples collected. The path header 508 includes data related to the corresponding path bundle. That data may change from each instead of a new path, but may not change for all the sample points within the path. The data from the path header 508 may also list a number and type of sensors collected. The sensor header 510 includes data related to each specific sensor for a path and includes technical information about their collection such as the sample frequency or the threshold that triggers a non-frequency-based sample. The sampling data 512 includes, for example, dynamically sized series of data samples that indicate which sensor is used, the time of the sample, the step number of the sample, whether it was frequency or threshold triggered, etc.

Figure 6:
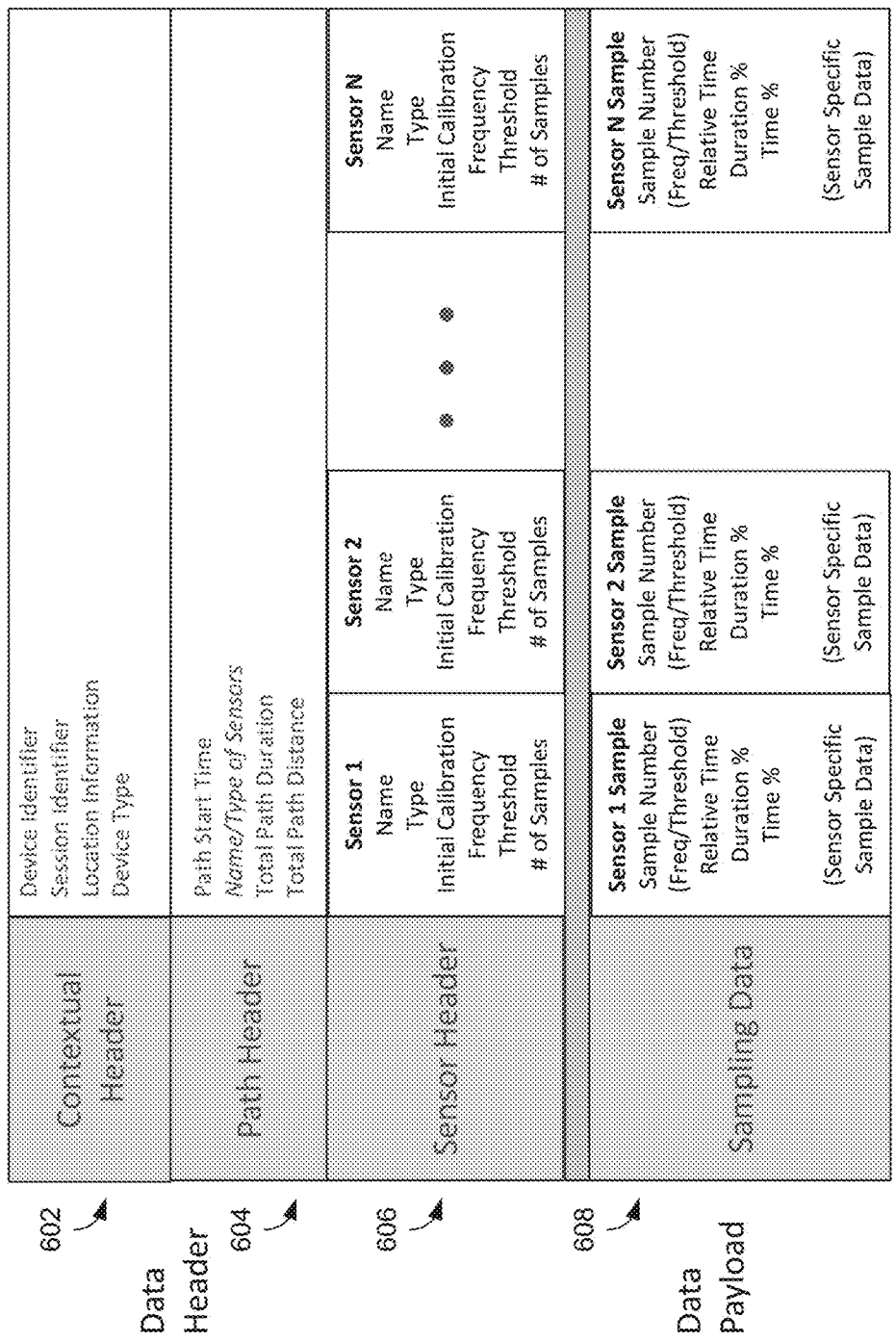
FIG. 6 is a diagram illustrating another example of a path bundle packaged data model.

FIG. 6 is a diagram illustrating an example of a path bundle packaged data model. The contextual header 602 includes, for example, a device identifier, a session identifier, location information, and a device type. The path header 604 includes, for example, a path start time, a name and type of sensors, a total path duration, and a total path distance. The sensor header 606 includes, for each sensor, for example sensor 1, a sensor name, a type of sensor, an initial calibration, a frequency, a threshold, and a number of samples. The sampling data 608 includes, for each sensor sample, a sample number, a frequency, a relative time, a duration percentage of the path, a time percentage of the path.

Figure 7:
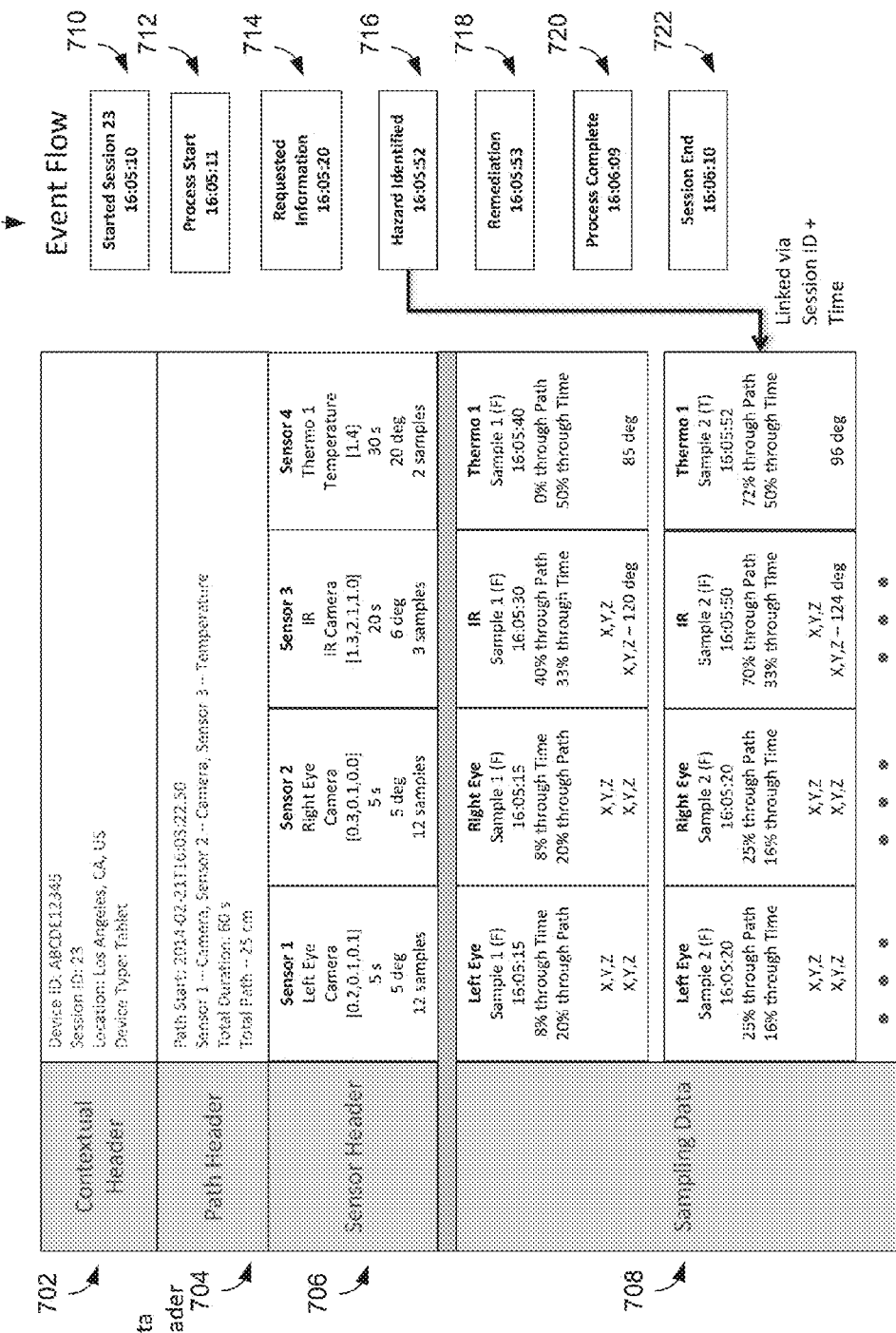
FIG. 7 is a diagram illustrating another example of a path bundle packaged data model.

FIG. 7 is a diagram illustrating another example of a path bundle packaged data model. The path bundle packaged data model includes examples of a contextual header 702, a path header 704, a sensor header 706, a sampling data 708.

The contextual header 702 may include, for example:
Device ID: ABCDE12345
Session ID: 23
Location: Los Angeles, Calif., US
Device Type: Tablet The path header 704 may include, for example:
Path Start: 2014-02-21T16:03:22.50
Sensor 1—Camera, Sensor 2—Camera, Sensor 3—Temperature
Total Duration: 60 s
Total Path—25 cm The sensor header 706 may include, for example:
Sensor 1
Left Eye
Camera
[0.2,0.1,0.1]
5 s
5 deg
12 samples The sampling data 708 may include, for example:
Left Eye
Sample 1 (F)
16:05:15
8% through Time
20% through Path
X,Y,Z The path bundle packaged data model may be linked to an event flow 710 by session identifier and time. For example, at operation 710, a session starts when user turns the device on, or resumes the device from a sleep/pause mode. At operation 712, the process starts when the user, or an automated process, indicates that a particular task or process has begun, such as a process to check a series of gauges. At operation 714, the user requests information about a particular step in the process. At operation 716, a hazard is identified. For example, the device identifies that a temperature gauge has risen above a dangerous threshold using computer vision techniques. At operation 718, the user is presented with steps to remediate the risk by lowering the temperature in question, recalibrating the gauge, etc. At operation 720, the user or an automated process indicates that the task or process has been completed. At operation 722, the session ends when the user turns their device off, or puts the device into a sleep/pause mode.

Figure 8:
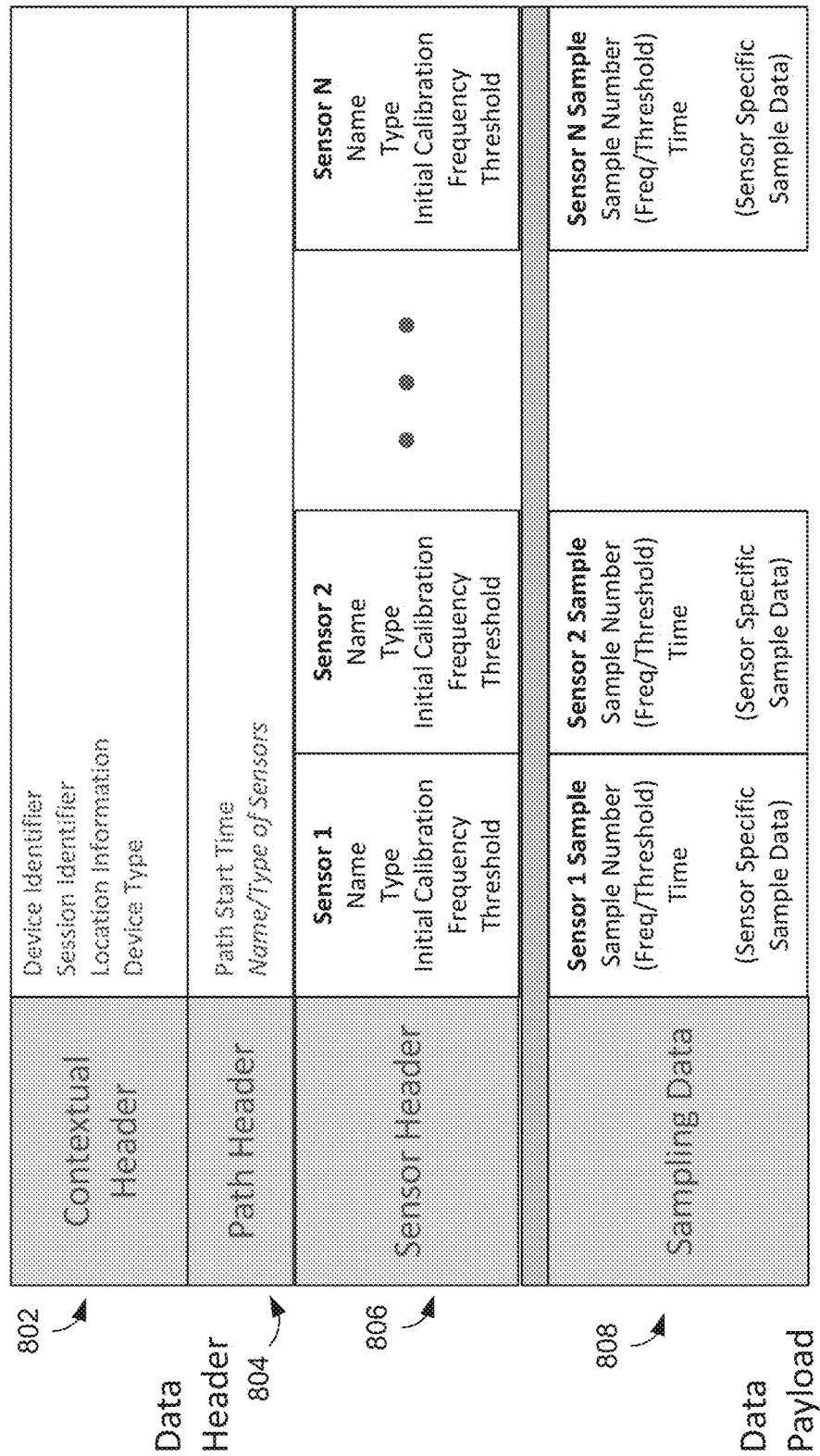
FIG. 8 is a diagram illustrating an example of a path bundle streaming data model.

FIG. 8 is a diagram illustrating an example of a path bundle streaming data model. The path bundle streaming data model includes a contextual header 802, a path header 804, a sensor header 806, and sampling data 808. The streaming model is a subset of the packaged model that removes any data points that would require information generated after the data point is generated. For example, the percentage of path length cannot be calculated for individual points until the total path length is determined.

Figure 9:
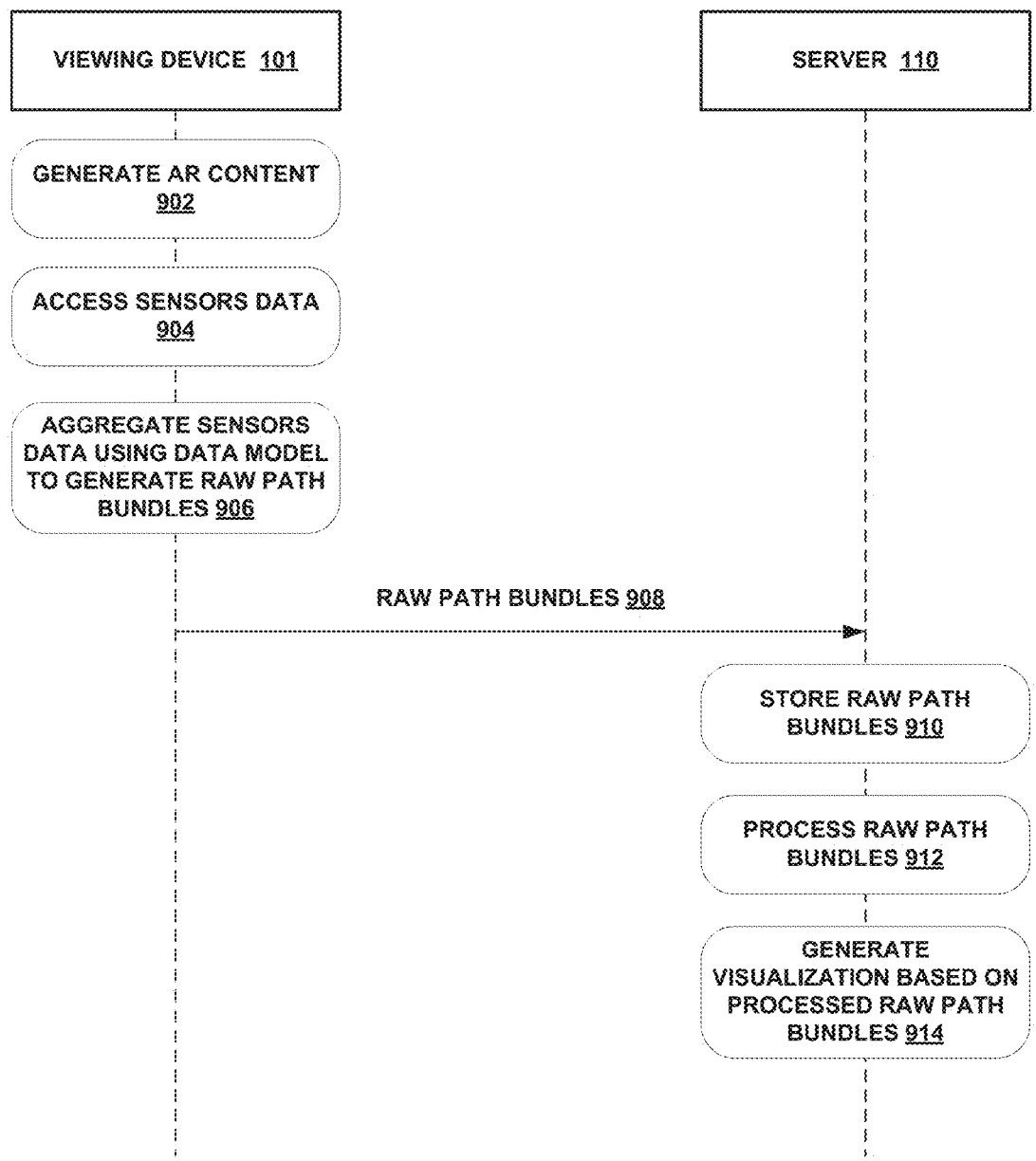
FIG. 9 is a ladder diagram illustrating an example embodiment of an operation of spatial data collection.

FIG. 9 is a ladder diagram illustrating an example embodiment of a method for spatial data collection and processing. At operation 902, the viewing device 101 generates an augmented reality content based on a physical object. At operation 904, the viewing device 101 accesses sensors data from the viewing device 101. At operation 906, the viewing device 101 aggregate sensors data using a data model to generate raw path bundles. At operation 908, the viewing device 101 communicates the raw path bundles to the server 110 for storage and processing. The server 110 stores raw path bundles at operation 910. The server 110 processes the raw path bundles at operation 912 using, for example, the path bundle processing module 404. The server 110 generates a visualization based on the processed raw path bundles at operation 914.

Figure 10:
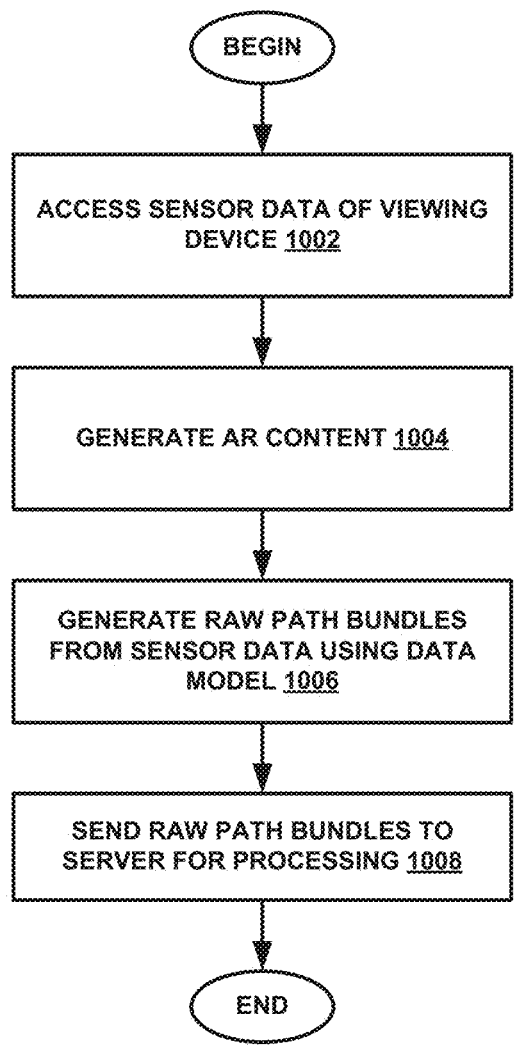
FIG. 10 is a flowchart illustrating an example operation of spatial data collection at a viewing device.

FIG. 10 is a flowchart illustrating an example method for spatial data collection at a viewing device. At operation 1002, the viewing device 101 accesses sensor data. At operation 1004, the viewing device 101 generates an augmented reality content. At operation 1006, the viewing device 101 generates raw path bundles from the sensor data using a data model. At operation 1008, the viewing device 101 sends the raw path bundles data using the data model to the server 110 for processing.

Figure 11:
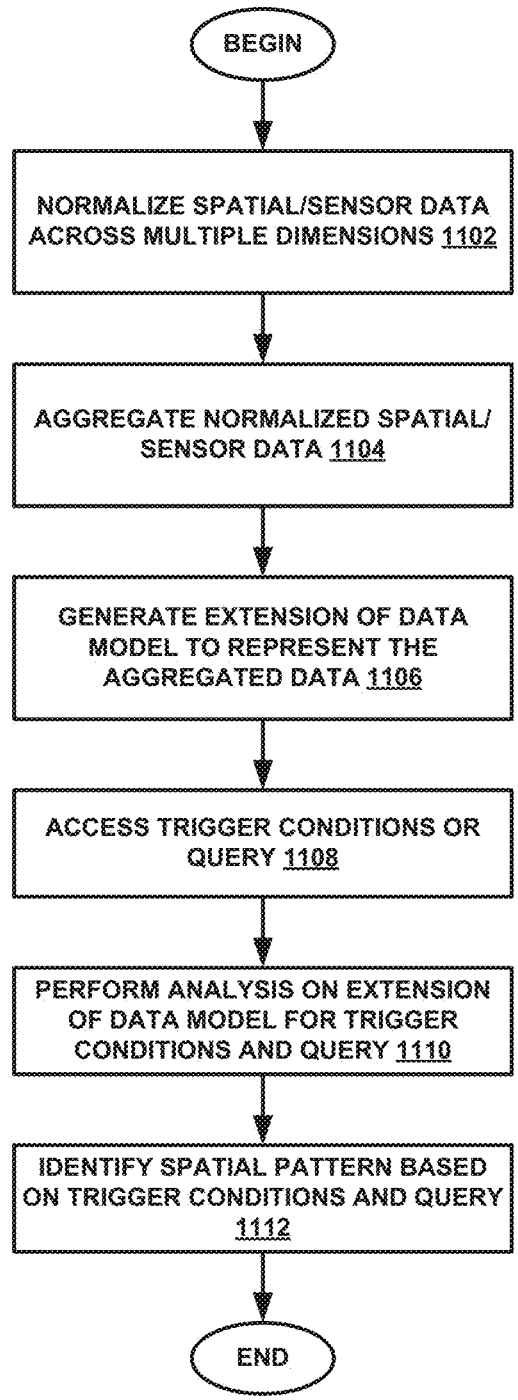
FIG. 11 is a flowchart illustrating an example operation of spatial data processing at a server.

FIG. 11 is a flowchart illustrating an example method for spatial data processing at a server connected to a viewing device. At operation 1102, the path bundle processing module 404 of the server 110 normalizes spatial and sensor data across multiple dimensions. At operation 1104, the path bundle processing module 404 aggregates the normalized spatial and sensor data. At operation 1106, the path bundle processing module 404 generates an extension of the data model to represent the aggregated data. At operation 1108, the path bundle processing module 404 accesses trigger conditions or queries. At operation 1110, the path bundle processing module 404 performs analysis on the extension of the data model for trigger conditions and queries. At operation 1112, the path bundle processing module 404 identifies spatial patterns based on conditions and queries.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
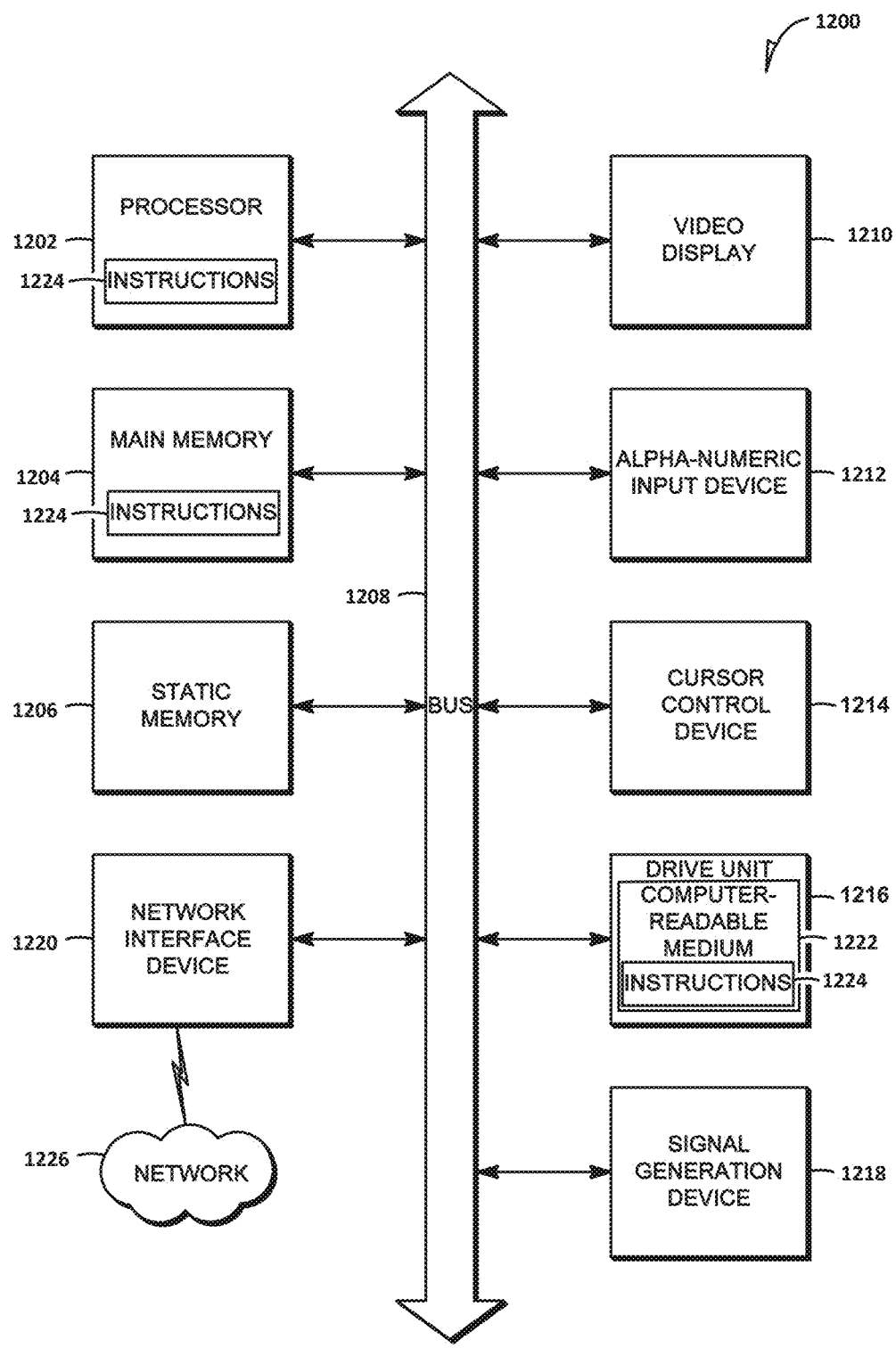
FIG. 12 is a block diagram illustrating components of a machine, according to some example embodiments, able to read instructions from a machine-readable medium and perform any one or more of the methodologies discussed herein.

FIG. 12 is a block diagram of a machine in the example form of a computer system 1200 within which instructions 1224 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions 1224 for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1224 for execution by the machine, and includes digital or analog communications signals or other intangible media to facilitate communication of such software.

Example Mobile Device

Figure 13:
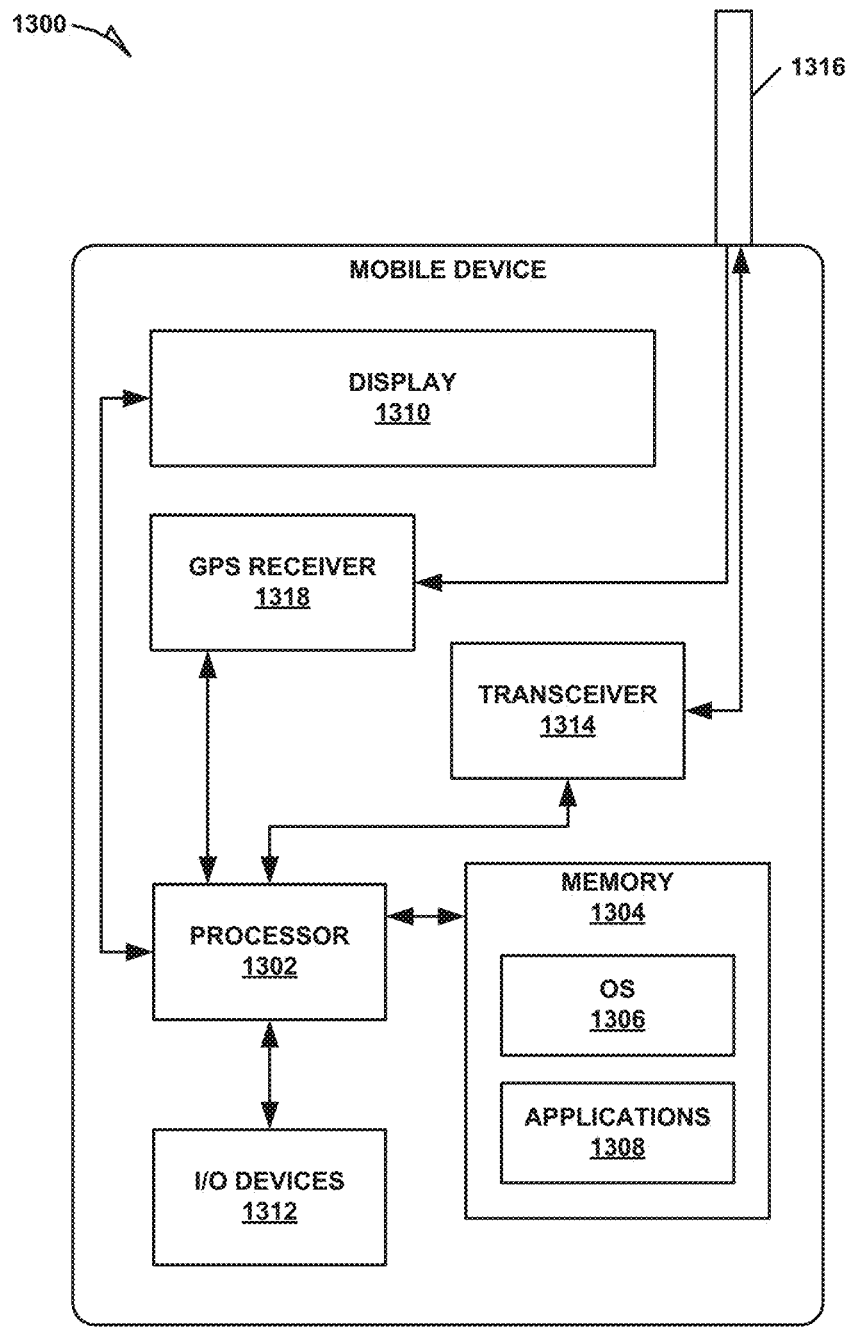
FIG. 13 is a block diagram illustrating a mobile device, according to an example embodiment.

FIG. 13 is a block diagram illustrating a mobile device 1300, according to an example embodiment. The mobile device 1300 may include a processor 1302. The processor 1302 may be any of a variety of different types of commercially available processors 1302 suitable for mobile devices 1300 (for example, an XScale architecture microprocessor, a microprocessor without interlocked pipeline stages (MIPS) architecture processor, or another type of processor 1302). A memory 1304, such as a random access memory (RAM), a flash memory, or other type of memory, is typically accessible to the processor 1302. The memory 1304 may be adapted to store an operating system (OS) 1306, as well as application programs 1308, such as a mobile location enabled application that may provide location-based services (LBSs) to a user. The processor 1302 may be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving, by a computing server, path bundle data packages from a head mounted viewing device, each path bundle data package including sensor data describing an orientation of the head mounted viewing device in relation to a physical object and indicating a portion of the physical object that is in a line of sight of a user wearing the head mounted viewing device;
determining, based on an aggregation of the path bundle data packages, a viewing pattern of the user wearing the viewing device in relation to the physical object, the viewing pattern indicating a sequential order in which portions of the physical object were in the line of sight of the user during a period of time;
comparing the viewing pattern of the user to a set of previously detected viewing patterns that preceded detected errors, yielding a comparison, the set of previously detected viewing patterns determined based on path bundle data packages received from a plurality of other users, and each previously detected viewing pattern indicating a detected sequential order in which portions of the physical object were in a line of sight of a respected other user during a previous period of time;
determining, based on the comparison, that the viewing pattern of the user matches a first previously detected viewing pattern, the first previously detected viewing pattern having preceded a first error; and
transmitting, to the viewing device, data causing the head mounted viewing device to display a message warning the user of the first error.

2. The method of claim 1, further comprising:
normalizing the path bundle data packages.

3. The method of claim 1, wherein the head mounted viewing device comprises a plurality of sensors, including an optical sensor and an inertia sensor.

4. The method of claim 1, wherein each path bundle data package comprises a viewing device identifier, a session identifier, a physical location, a viewing device type, and a time.

5. The method of claim 1, wherein the message warning the user of the first error comprises a visual indicator that redirects the user to an identified focus point of the physical object.

6. The method of claim 1, further comprising:
prior to receiving the path bundle data packages from the head mounted viewing device, receiving, from at least two other head mounted viewing devices, previously received path bundle data packages; and
determining, based on an aggregation of the previously received path bundle data packages, the set of previously detected viewing patterns.

7. The method of claim 6, wherein the previously received path bundle data packages include sensor data describing an orientation of the at least two other head mounted viewing devices in relation to the physical object.

8. A system comprising:
one or more computer processors; and
one or more computer readable mediums storing instructions that, when executed by the one or more computer processors, cause the system to perform operations comprising:
receiving path bundle data packages from a head mounted viewing device, each path bundle data package including sensor data describing an orientation of the head mounted viewing device in relation to a physical object and indicating a portion of the physical object that is in a line of sight of a user wearing the head mounted viewing device;
determining, based on an aggregation of the path bundle data packages, a viewing pattern of the user wearing the viewing device in relation to the physical object, the viewing pattern indicating a sequential order in which portions of the physical object were in the line of sight of the user during a period of time;
comparing the viewing pattern of the user to a set of previously detected viewing patterns that preceded detected errors, yielding a comparison, the set of previously detected viewing patterns determined based on path bundle data packages received from a plurality of other users, and each previously detected viewing pattern indicating a detected sequential order in which portions of the physical object were in a line of sight of a respected other user during a previous period of time;
determining, based on the comparison, that the viewing pattern of the user matches a first previously detected viewing pattern, the first previously detected viewing pattern having preceded a first error; and
transmitting, to the viewing device, data causing the viewing to display a message warning the user of the first error.

9. The system of claim 8, the operations further comprising:
normalizing the path bundle data packages.

10. The system of claim 8, wherein the head mounted viewing device comprises a plurality of sensors, including an optical sensor and an inertia sensor.

11. The system of claim 8, wherein each path bundle data package comprises a viewing device identifier, a session identifier, a physical location, a viewing device type, and a time.

12. The system of claim 8, wherein the message warning the user of the first error comprises a visual indicator that redirects the user to an identified focus point of the physical object.

13. The system of claim 8, the operations further comprising:
prior to receiving the path bundle data packages from the head mounted viewing device, receiving, from at least two other head mounted viewing devices, previously received path bundle data packages; and determining, based on an aggregation of the previously received path bundle data packages, the set of previously detected viewing patterns.

14. The system of claim 13, wherein the previously received path bundle data packages include sensor data describing an orientation of the at least two other head mounted viewing devices in relation to the physical object.

15. A non-transitory computer readable medium storing instructions that, when executed by one or more computer processors of a computing server, cause the computing server to perform operations comprising:
 receiving path bundle data packages from a head mounted viewing device, each path bundle data package including sensor data describing an orientation of the head mounted viewing device in relation to a physical object and indicating a portion of the physical object that is in a line of sight of a user wearing the head mounted viewing device;
 determining, based on an aggregation of the path bundle data packages, a viewing pattern of the user wearing the viewing device in relation to the physical object, the viewing pattern indicating a sequential order in which portions of the physical object were in the line of sight of the user during a period of time;
 comparing the viewing pattern of the user to a set of previously detected viewing patterns that preceded detected errors, yielding a comparison, the set of previously detected viewing patterns determined based on path bundle data packages received from a plurality of other users, and each previously detected viewing pattern indicating a detected sequential order in which portions of the physical object were in a line of sight of a respected other user during a previous period of time;
 determining, based on the comparison, that the viewing pattern of the user matches a first previously detected viewing pattern, the first previously detected viewing pattern having preceded a first error; and
 transmitting, to the viewing device, data causing the viewing to display a message warning the user of the first error.

16. The non-transitory computer readable medium of claim 15, the operations further comprising:
 normalizing the path bundle data packages.

17. The non-transitory computer readable medium of claim 15, wherein the head mounted viewing device comprises a
 plurality of sensors, including an optical sensor and an inertia sensor.

18. The non-transitory computer readable medium of claim 15, wherein each path bundle data package comprises a viewing device identifier, a session identifier, a physical location, a viewing device type, and a time.

19. The non-transitory computer readable medium of claim 15, wherein the message warning the user of the first error comprises a visual indicator that redirects the user to an identified focus point of the physical object.

20. The non-transitory computer readable medium of claim 15, the operations further comprising:
 prior to receiving the path bundle data packages from the head mounted viewing device, receiving, from at least two other head mounted viewing devices, previously received path bundle data packages; and
 determining, based on an aggregation of the previously received path bundle data packages, the set of previously detected viewing patterns.

21. The non-transitory computer readable medium of claim 20, wherein the previously received path bundle data packages include sensor data describing an orientation of the at least two other head mounted viewing devices in relation to the physical object.

* * * * *